US006103386A

United States Patent [19]

Raybould et al.

[11] Patent Number: 6,103,386

[45] Date of Patent: Aug. 15, 2000

[54] THERMAL BARRIER COATING WITH ALUMINA BOND INHIBITOR

[76] Inventors: Derek Raybould, 2 Horizon Dr., Denville, N.J. 07834; Thomas E. Strangman, 7632 N. 22th St., Phoenix, Ariz. 85020; William E. Fischer, 37 Highland Ave., Stanhope, N.J. 07874-8904; Paul A. Chipko, 86 Hoagland Rd., Blairstown, N.J. 07825

[21] Appl. No.: 08/944,391

[22] Filed: Oct. 6, 1997

Related U.S. Application Data

[60] Continuation-in-part of application No. 08/635,444, Apr. 19, 1996, which is a division of application No. 08/341,798, Nov. 18, 1994, Pat. No. 5,562,998.

[51] Int. Cl.[7] .......... B32B 15/04

[52] U.S. Cl. .......... 428/472; 428/469; 428/697; 428/701; 428/702

[58] Field of Search .......... 428/472, 469, 428/701, 697, 702

[56] References Cited

U.S. PATENT DOCUMENTS

| | | |
|---|---|---|
| 2,927,043 | 3/1960 | Stetson . |
| 3,415,672 | 12/1968 | Levinstein et al. . |
| 3,489,537 | 1/1970 | Cook . |
| 3,849,865 | 11/1974 | Gedwill et al. . |
| 3,869,779 | 3/1975 | Gedwill et al. . |
| 3,955,935 | 5/1976 | Shockley et al. . |
| 3,978,251 | 8/1976 | Stetson et al. . |
| 3,979,534 | 9/1976 | Rairden, III . |
| 3,996,021 | 12/1976 | Chang et al. . |
| 4,005,989 | 2/1977 | Preston . |
| 4,080,486 | 3/1978 | Walker et al. . |
| 4,248,940 | 2/1981 | Goward et al. . |
| 4,298,385 | 11/1981 | Claussen et al. . |
| 4,321,310 | 3/1982 | Ulion et al. . |
| 4,321,311 | 3/1982 | Strangman . |
| 4,335,190 | 6/1982 | Bill et al. . |
| 4,374,183 | 2/1983 | Deadmore et al. . |
| 4,401,697 | 8/1983 | Strangman . |
| 4,405,659 | 9/1983 | Strangman . |
| 4,405,660 | 9/1983 | Ulion et al. . |
| 4,414,249 | 11/1983 | Ulion et al. . |
| 4,447,503 | 5/1984 | Dardi et al. . |
| 4,676,994 | 6/1987 | Demaray . |
| 4,880,614 | 11/1989 | Strangman . |
| 4,916,022 | 4/1990 | Solfest et al. . |
| 5,015,502 | 5/1991 | Strangman et al. . |
| 5,059,095 | 10/1991 | Kushner et al. . |
| 5,073,433 | 12/1991 | Taylor . |
| 5,238,752 | 8/1993 | Duderstadt et al. . |
| 5,498,484 | 3/1996 | Duderstadt . |
| 5,562,998 | 10/1996 | Strangman . |
| 5,624,721 | 4/1997 | Strangman . |
| 5,773,141 | 6/1998 | Hasz et al. .......... 428/472 |

FOREIGN PATENT DOCUMENTS

| | | |
|---|---|---|
| 0 609 795 A1 | 1/1994 | European Pat. Off. . |
| 0 609 765 A2 | 10/1994 | European Pat. Off. . |
| 2 269 392 | 9/1994 | United Kingdom . |

*Primary Examiner*—Archene Turner
*Attorney, Agent, or Firm*—Jerry J. Holden

[57] ABSTRACT

A thermal barrier coating for superalloy turbine engine vanes and blades that are exposed to high temperature gas is disclosed. The coating includes an aluminide or MCrAlY layer, an alumina layer, and a ceramic top layer. The ceramic layer has a columnar grain microstructure. A bond inhibitor is disposed in the gaps between the columnar grains. This inhibitor is preferably alumina.

14 Claims, 7 Drawing Sheets

THERMAL BARRIER COATING WITH ALUMINA BOND INHIBITOR

CROSS-REFERENCE TO RELATED APPLICATIONS

This application is a continuation-in-part of application Ser. No. 08/635,444, filed Apr. 19, 1996, pending which in turn was a divisional of application Ser. No. 08/341,798, filed Nov. 18, 1994, now U.S. Pat. No. 5,562,998 which issued on Oct. 8, 1996.

TECHNICAL FIELD

This invention relates generally to thermal barrier coatings for superalloy substrates and in particular to a multilayer, ceramic thermal barrier coating resistant to sintering damage for superalloy blades and vanes in gas turbine engines.

BACKGROUND OF THE INVENTION

As gas turbine engine technology advances and engines are required to be more efficient, gas temperatures within the engine continue to rise. However, the ability to operate at these increasing temperatures is limited by the ability of the superalloy turbine blades and vanes to maintain their mechanical strength when exposed to the heat, oxidation, and corrosive effects of the impinging gas. One approach to this problem has been to apply a protective thermal barrier coating which insulates the blades and vanes and inhibits oxidation and hot gas corrosion.

Typically, the thermal barrier coating will have an outer ceramic layer that has a columnar grained microstructure. Gaps between the individual columns allow the columnar grains to expand and contract without developing stresses that could cause spalling. Strangman, U.S. Pat. Nos. 4,321,311, 4,401,697, and 4,405,659 disclose a thermal barrier coating for a superalloy substrate that contains a MCrAlY layer, an alumina layer, and an outer columnar grained ceramic layer. Duderstadt et al., U.S. Pat. No. 5,238,752 and Strangman, U.S. Pat. No. 5,514,482 disclose a thermal barrier coating for a superalloy substrate that contains an aluminide layer, an alumina layer, and an outer columnar grained ceramic layer. problem with columnar grained ceramic layers is that when exposed to temperatures over 1100° C. (2012° F.) for substantial periods of time, sintering of the columnar grains occurs. The gaps close as adjacent columnar grains bond together. Once the gaps become closed, the ceramic layer can no longer accommodate the thermal expansion and may spall or crack.

Strangman, U.S. Pat. No. 5,562,998 discloses a superalloy substrate having a thermal barrier coating that includes an aluminide or MCrAlY layer, an alumina layer, and a ceramic top layer. The ceramic layer has a columnar grain microstructure. A bond inhibitor selected from a group consisting of unstabilized zirconia, unstabilized hafnia, and mixtures thereof is interposed between the columnar grains.

The Applicants have discovered additional bond inhibitors that can be advantageously used with thermal barrier coatings.

SUMMARY OF THE INVENTION

An object of the present invention is to provide a superalloy article having a thermal barrier coating which includes a ceramic layer that is resistant to sintering when exposed to high temperature gas.

Another object of the present invention is to provide a method of applying a sintering resistant thermal barrier coating to a superalloy substrate.

The present invention achieves these objects by providing a thermal barrier coating for a superalloy substrate that includes an aluminide or MCrAlY layer, an alumina layer, and a ceramic top layer. The ceramic layer has a columnar grain microstructure. A bond inhibitor is disposed in the gaps between the columnar grains. This inhibitor is preferably alumina, but may be selected from any of the following: unstabilized zirconia, unstabilized hafnia, alumina, silica, titania and mixtures thereof.

DESCRIPTION OF THE PREFERRED EMBODIMENT

Figure 1:
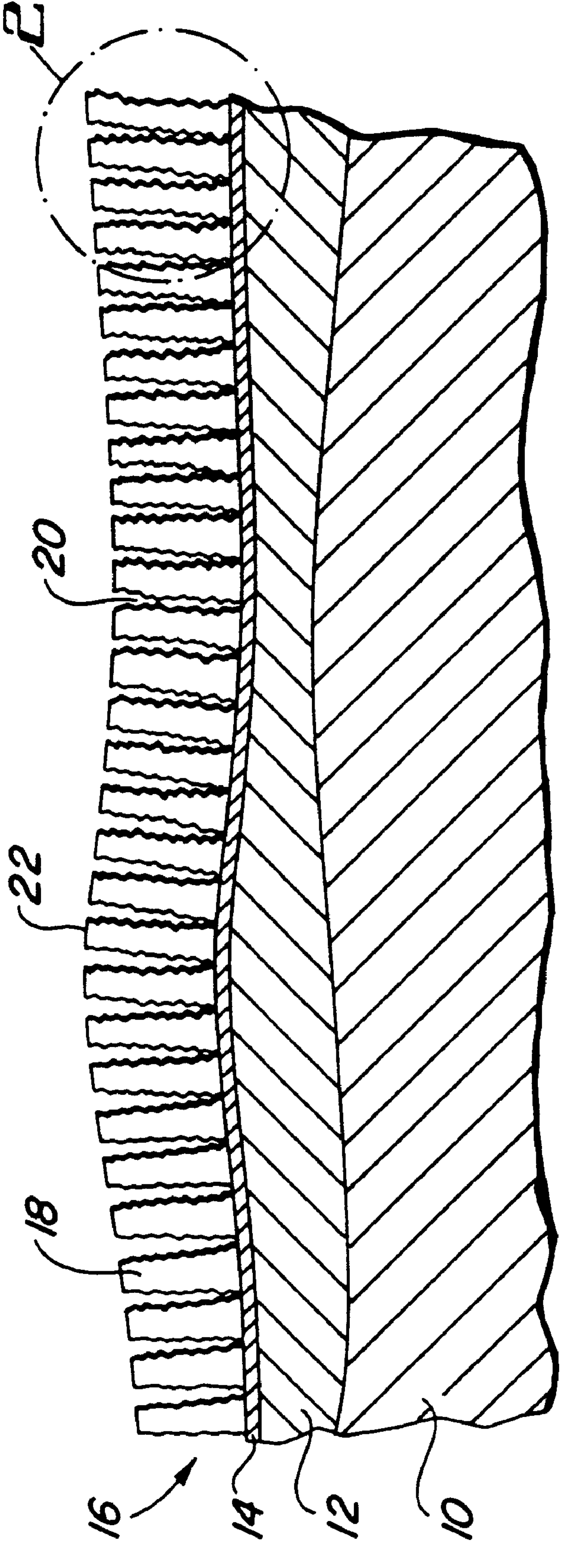
FIG. 1 is a cross sectional schematic of a coated article as contemplated by the present invention.
Figure 2:
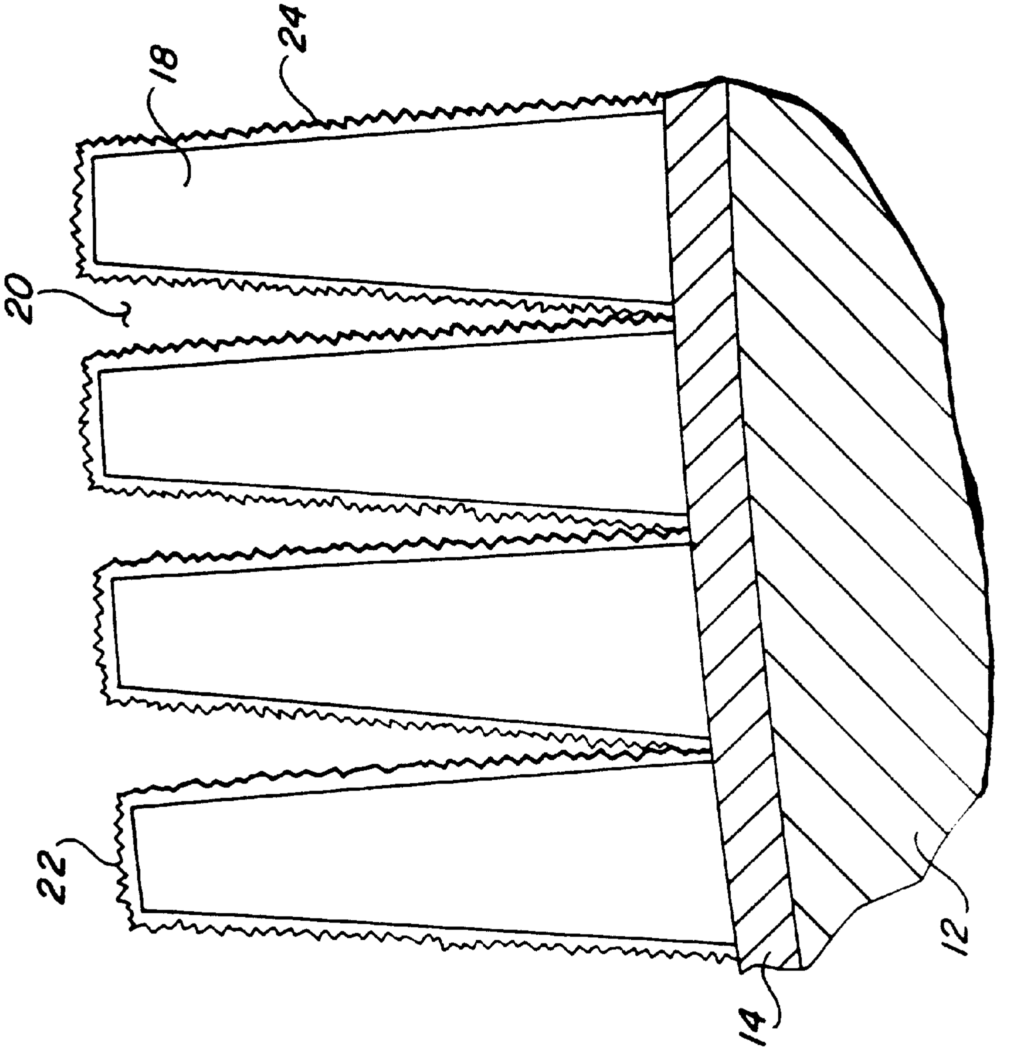
FIG. 2 is an enlargement of a portion of FIG. 1.

Referring to the drawing, a base metal or substrate 10 is a nickel, cobalt or iron based high temperature alloy from which turbine airfoils are commonly made. Preferably, the substrate 10 is a superalloy having hafnium and/or zirconium such as MAR-M247, IN-100 and MAR-M 509, the compositions of which are shown in Table 1.

TABLE 1

| Alloy | Mo | W | Ta | Al | Ti | Cr | Co | Hf | V | Zr | C | B | Ni |
|---|---|---|---|---|---|---|---|---|---|---|---|---|---|
| Mar-M247 | .65 | 10 | 3.3 | 5.5 | 1.05 | 8.4 | 10 | 1.4 | — | .055 | .15 | .15 | bal. |
| IN-100 | 3.0 | — | — | 5.5 | 4.7 | 9.5 | 15.0 | | 1.0 | .06 | .17 | .015 | bal. |
| Mar-M509 | — | 7.0 | 3.5 | — | 0.25 | 23.4 | Bal. | — | — | .5 | .6 | — | 10.0 |

A bond coat 12 lies over the substrate 10. The bond coat 12 is usually comprised of a MCrAlY alloy. Such alloys have a broad composition of 10 to 35% chromium, 5 to 15% aluminum, 0.01 to 1% yttrium, or hafnium, or lanthanum, with M being the balance. M is selected from a group consisting of iron, cobalt, nickel, and mixtures thereof Minor amounts of other elements such as Ta or Si may also be present. These alloys are known in the prior art and are described in U.S. Pat. Nos. 4,880,614; 4,405,659; 4,401,696; and 4,321,311 which are incorporated herein by reference. The MCrAlY bond coat is preferably applied by electron beam vapor deposition though sputtering, low pressure plasma spraying, and high velocity oxy-fuel (HVOF) processing may also be used.

Alternatively, the bond coat 12 can be comprised of an intermetallic aluminide, such as nickel aluminide or platinum aluminide. The aluminide bond coat can be applied by standard commercially available aluminide processes whereby aluminum is reacted at the substrate surface to form an aluminum intermetallic compound which provides a reservoir for the growth of an alumina scale oxidation resistant layer. Thus the aluminide coating is predominately composed of aluminum intermetallic [e.g. NiAl, CoAl, FeAl and (Ni, Co, Fe)Al phases] formed by reacting aluminum vapor species, aluminum rich alloy powder or surface layer with the substrate elements in the outer layer of the superalloy component. This layer is typically well bonded to the substrate. Aluminiding may be accomplished by one of several conventional prior art techniques, such as, the pack cementation process, spraying, chemical vapor deposition, electrophoresis, sputtering, and slurry sintering with an aluminum rich vapor and appropriate diffusion heat treatments. Other beneficial elements can also be incorporated into diffusion aluminide coatings by a variety of processes. Beneficial elements include Pt, Pd, Si, Hf, Y and oxide particles, such as alumina, yttria, hafnia, for enhancement of alumina scale adhesion, Cr and Mn for hot corrosion resistance, Rh, Ta and Cb for diffusional stability and/or oxidation resistance and Ni, Co for increasing ductility or incipient melting limits.

Use of an MCrAlY or aluminide bond coating is optional if the nickel-base superalloy is capable of forming a highly adherent aluminium oxide scale. In order to be viable without a bond coating, the superalloy should have an exceptionally low sulfur (less than 1 part per million) content and/or an addition of 0.01 to 0.1 percent by weight yttrium to the alloy chemistry.

In the specific case of platinum modified diffusion aluminide coating layers, the coating phases adjacent to the alumina scale will be platinum aluminide and/or nickel-platinum aluminide phases (on a Ni-base superalloy). Intermetallic bond coats are known in the prior art and are described in U.S. Pat. No. 5,238,752 and U.S. Pat. No. 5,514,482, which are incorporated herein by reference.

Through oxidation an alumina or aluminum oxide layer 14 is formed over the bond coat 12. The alumina layer 14 provides both oxidation resistance and a bonding surface for the ceramic layer 16. The alumina layer 14 may be formed before the ceramic layer 16 is applied, during application of layer 16, or subsequently by heating the coated article in an oxygen containing atmosphere at a temperature consistent with the temperature capability of the superalloy, or by exposure to the turbine environment. The sub-micron thick alumina scale will thicken on the aluminide surface by heating the material to normal turbine exposure conditions. The thickness of the alumina scale is preferably sub-micron (up to about one micron).

The ceramic layer 16 is applied by electron beam vapor deposition and, as a result, has a columnar grained microstructure. The columnar grains or columns 18 are oriented substantially perpendicular to the surface of the substrate 10. Between the individual columns 18 are micron sized gaps 20 extending from the outer surface 22 of the ceramic layer 16 toward (within a few microns) of the alumina layer 14. The presence of intercolumnar gaps reduces the effective modulus (increases compliance) of the stabilized zirconia layer in the plane of the coating. Increased compliance provided by the gaps enhances coating durability by eliminating or minimizing stresses associated with thermal gradient and superalloy/zirconia thermal expansion mismatch strains in the stabilized zirconia layer. Alternatively, the ceramic layer 18 can be applied by a plasma spray process which creates an interconnected network of subcritical microcracks with micron-width opening displacements, which reduce the modulus of the stabilized zirconia layer. The network of subcritical microcracks performs the same function as the gaps 20. Although this process does not produce a columnar microstructure, the microcracks define column-like structures of the ceramic layer. In this application the term "gap" includes these microcracks.

The ceramic layer 16 may be any of the conventional ceramic compositions used for this purpose. A preferred composition is the yttria stabilized zirconia coating. These zirconia ceramic layers have a thermal conductivity that is about 1 and one-half orders of magnitude lower than that of the typical superalloy substrate such as MAR-M247. The zirconia may be stabilized with CaO, MgO, $CeO_2$ as well as $Y_2O_3$. Other ceramics believed to be useful as the columnar type coating material within the scope of the present invention are hafnia and ceria which can be yttria-stabilized. The particular ceramic material selected should be stable in the high temperature environment of a gas turbine. The thickness of the ceramic layer may vary from 1 to 1000 microns, but is typically in the 50 to 300 microns range.

Because of differences in the coefficients of thermal expansion between the substrate 10 and the ceramic layer 16, when heated or cooled, the substrate 10 expands (or contracts) at a greater rate than the ceramic layer 16. The gaps 20 allow the columnar grains 18 to expand and contract without producing stresses that would cause the ceramic layer to spall or crack.

When exposed to temperatures over 1100° C. (2012° F.) for periods of time, sintering of the columnar grains 18 occurs. The gaps 20 close as adjacent columnar grains 18 bond together. With the gaps 20 closed, the ceramic layer 16 is less able to accommodate the thermal expansion mismatch and may spall or crack. Resistance to sintering is imparted to the columnar grains 18 by sheathing them with a submicron layer of bond inhibitor 24. The bond inhibitor 24 is preferably an "inert" material such as alumina. Unstabilized zirconia which will cycle through disruptive tetragonal and monoclinic phase transformations every thermal cycle and thereby inhibit bonding of adjacent grains 18, could also be used. Silica which alloys with the zirconia, but forms a phase with an extremely low coefficient of thermal expansion could result in the gap reforming by breaking at the interface to this phase during every heating and cooling cycle. Unstabilized hafnia or titanium dioxide are other materials that may be used as the bond inhibitor. Hafnium oxide may also significantly increase the temperature required for sintering because its melting temperature is about 200° C. (392° F.) higher than that of zirconia. Pure hafnia also has a monoclinic structure which should bond poorly with the tetragonal or cubic phase of the yttria stabilized zirconia grains 18. Mixtures of these preferably in the range 25 to 50% could combine the advantages of the separate inhibitors. These could be applied in mixtures from one solution, or as alternate dips(coatings) in the different solutions, with the part being dried or dried and fired between each dip.

The bond inhibitor 24 is applied by immersing the coated substrate in a sol gel bath of alumina alkoxide in a solution of either xylene or toluene, other solutions may also be used. The solution should have a viscosity of less than 100 centipoise, and preferably less than 2 centipoise, in order to ensure complete penetration between the gaps. However, penetration of the gaps has been found to occur in solutions having a viscosity as high as 400 centipoise. The concentration of the alumina alkoxide in the solution should be between 5 and 30 percent by weight, with a preferable concentration being between 10 and 20 percent. An advantage to using xylene is that the percent water can be controlled at a very low level, (i.e. 0.01 percent) thus reducing the possibility of polymerization in the solution prior to coating and drying. (Polymerization in the solution results in a high viscosity solution). The sol gel is transformed to an alumina coating by polymerization and then drying off the solution at 100° C. followed by a low-temperature heat treatment that densifies the alumina particles. For alumina the heat treatment should occur at a temperature between 500 to 700° C., so the rest of the coating and substrate is not affected. Zirconia can be fired at even lower temperatures. Alternatively, the alumina may be applied by multiple dips of the coated substrate in the sol gel bath, with the part being dried or dried and fired between each dip.

The process of introducing fine particles within the gaps may be further understood by considering the chemical reactions involved which show how the alumina particles are synthesized within the gap and not just deposited there by the solution. A simplified example of the reactions involved in the synthesis of alumina is:

$$Al(OC_4H_9)_3+H_2O=Al(OC_4H_9)_2(OH)+C_4H_9OH$$

$$2Al(OC_4H_9)_2(OH)=2AlO(OH)+yC_4H_9OH$$

$$2Al(OC_4H_9)_2(OH)+2H_2O=2Al(OH)_3+2C_4H_9OH$$

$$AlOOH \text{ or } Al(OH)_3=Al_2O_3+zH_2O$$

EXAMPLE

Figure 3:
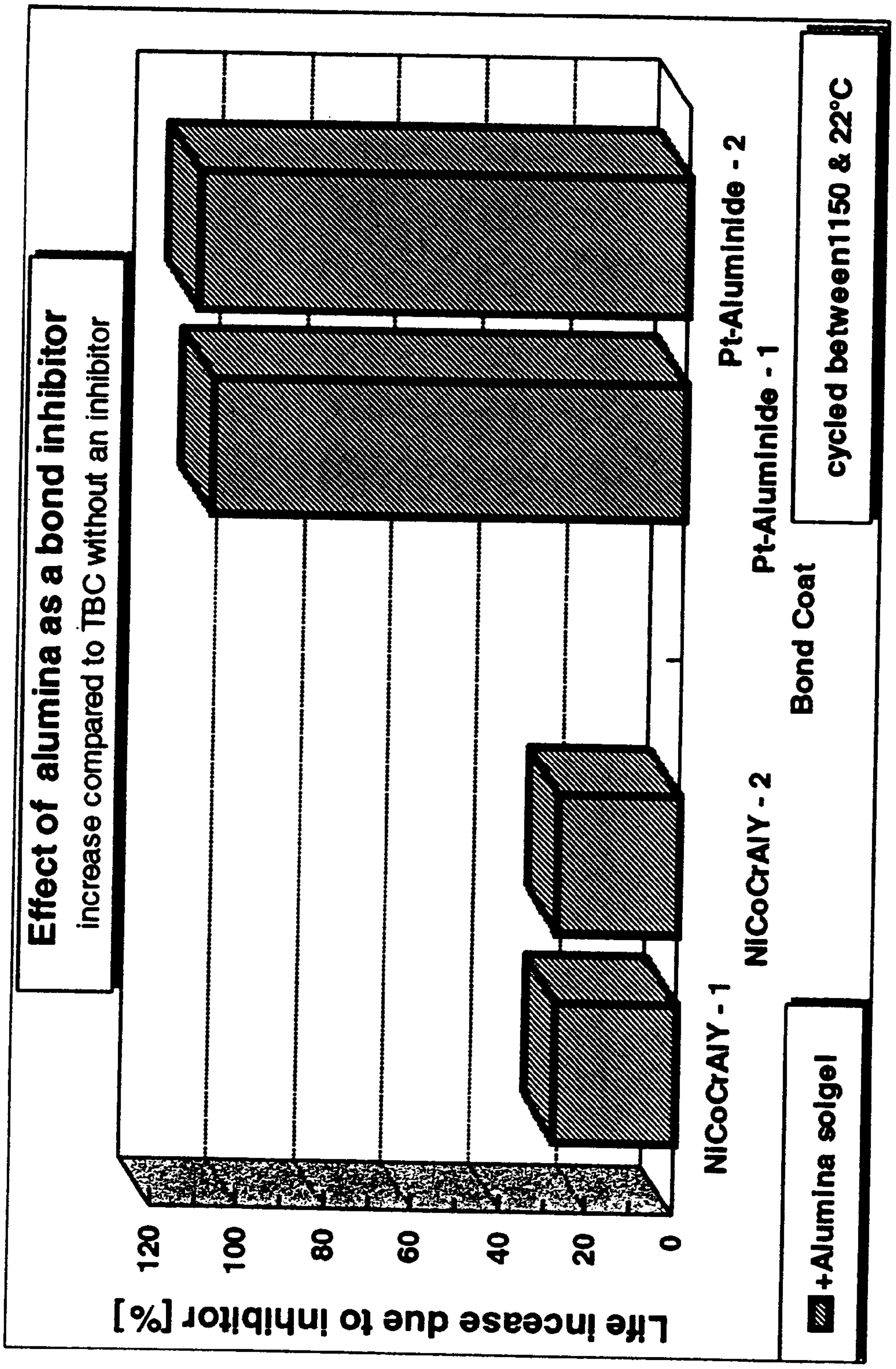
FIG. 3 shows the increase in life achieved by the bond inhibitor contemplated by the present invention.

Two specimens consisting of MAR-M247 substrate, a bond coat of NiCoCrAlY, and a top ceramic coat of stabilized zirconia were prepared. Also, two specimens consisting of MAR-M247 substrate, a bond coat of platinum aluminide, and a top ceramic coat of stabilized zirconia were prepared. The alumina bond inhibitor of the present invention was then applied to all the specimens and the specimens were then cycled between 1150° C. and room temperature (22° C.) until part of the ceramic top coat spalled. Referring to FIG. 3, the specimens with the NiCoCrAlY bond demonstrated a 25 percent increase in life when compared to identical specimens without the alumina bond inhibitor. More impressively, the specimens with the platinum aluminide bond coat exhibited a 100 percent increase in life when compared to identical specimens without the alumina bond coat.

Figure 4:
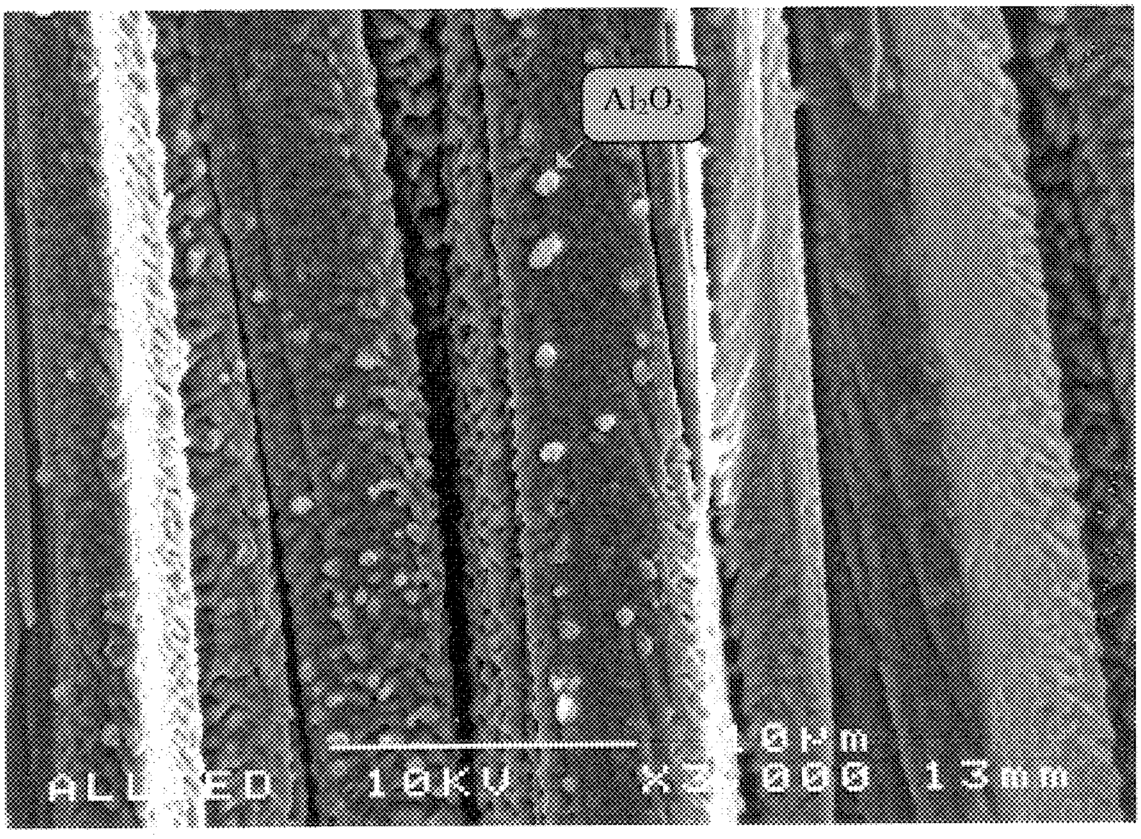
FIG. 4 is a scanning electron micrograph of a coated article as contemplated by the present invention which was removed from the furnace at 0.5 times the life of a prior art article without the alumina bond inhibitor as contemplated by this invention.
Figure 5A:
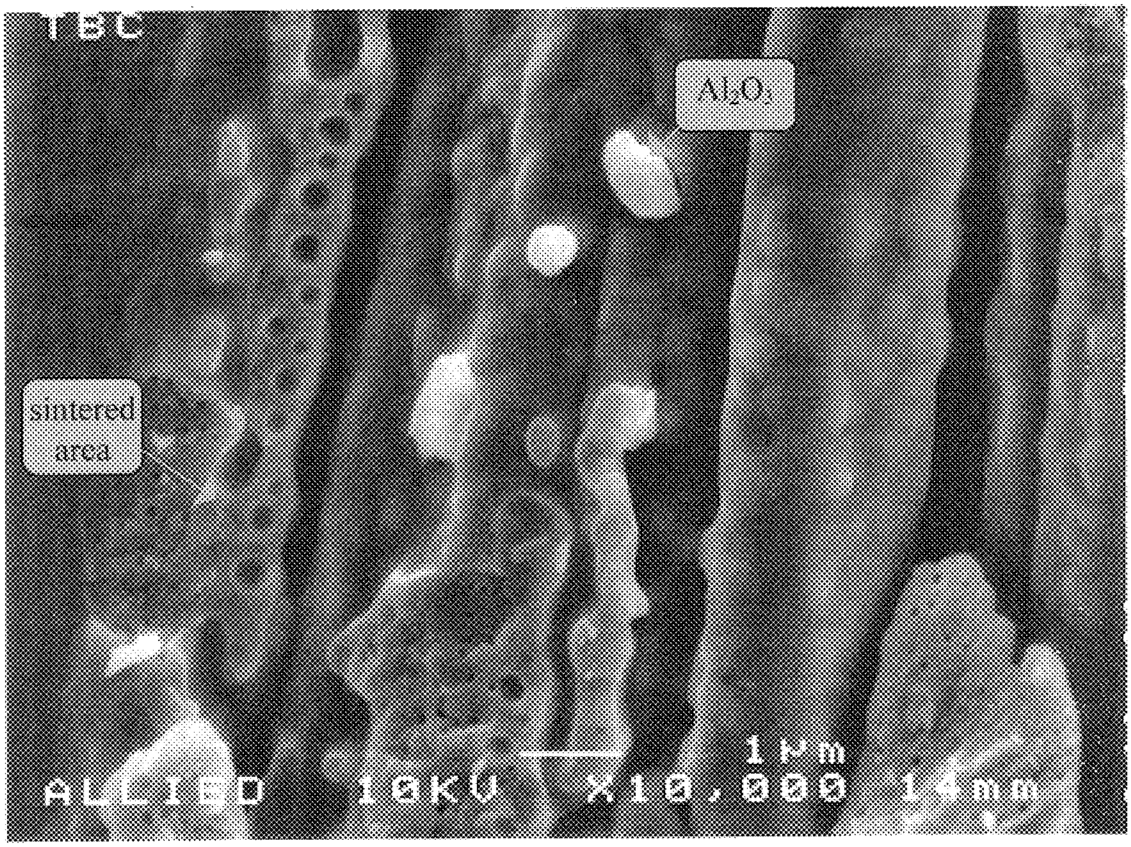
FIGS. 5*a* and 5*b* are scanning electron micrographs of a coated article as contemplated by the present invention which was removed from the furnace at 1.9 times the life of a prior art article without the alumina bond inhibitor as contemplated by this invention
Figure 5B:
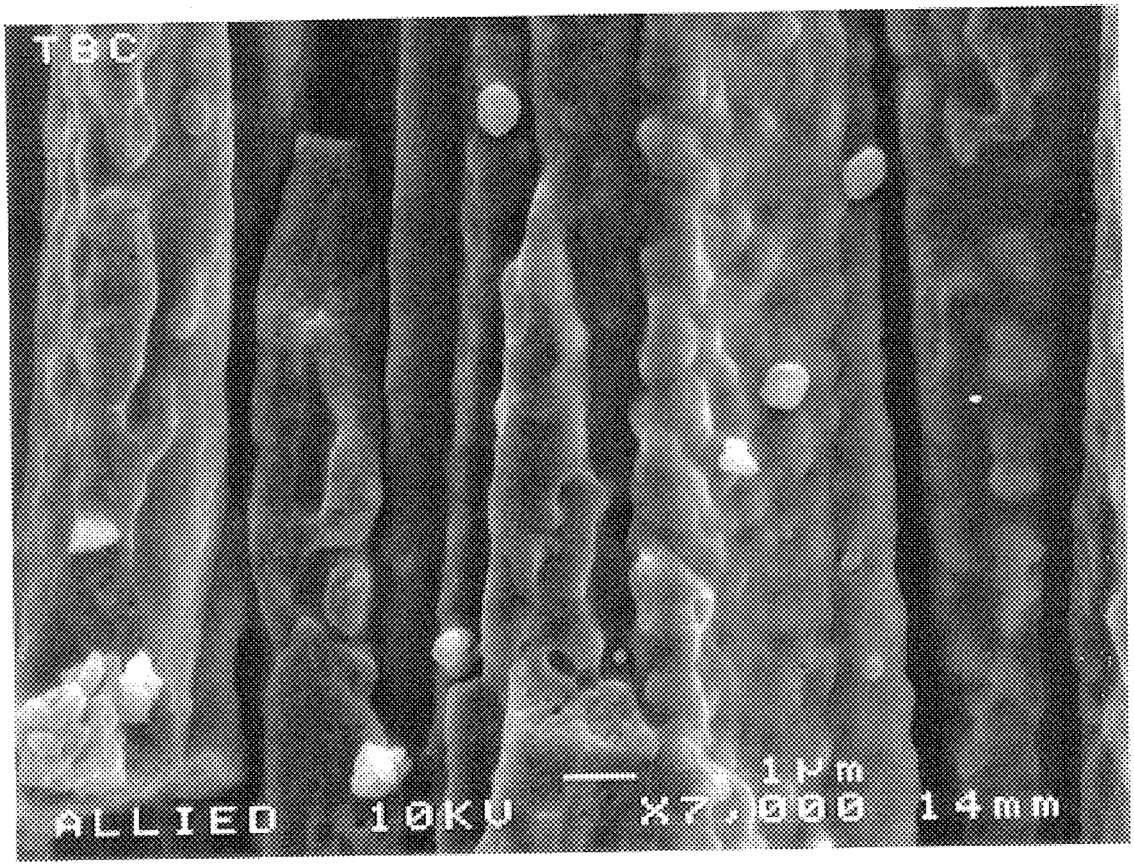

This increase in life was confirmed to be due to the alumina acting as a bond inhibitor by scanning electron microscopy of the stabilized zirconia on a platinum aluminide bond coat. As shown in FIG. 4, a specimen made in accordance with the present invention was removed early (0.5 of times the life of such a specimen without the bond inhibitor) from the cyclic furnace and shows the gaps between the columnar grains as still being open. The alumina particles can be seen attached to the walls of the columnar grains. FIGS. 5*a* and 5*b* show a specimen removed just prior to failure (at 1.9 times the life of such a specimen without the bond inhibitor). Significant sintering of the ceramic top coat in all the areas not coated by alumina particles is clearly seen in some areas of FIG. 5*a*. In the areas coated with alumina, as for most areas shown in FIG. 5*b,* the gaps have not sintered together and the alumina particles can still be clearly seen. A micro probe was used to confirm the chemistry of the alumina particles shown in these figures.

Figure 6:
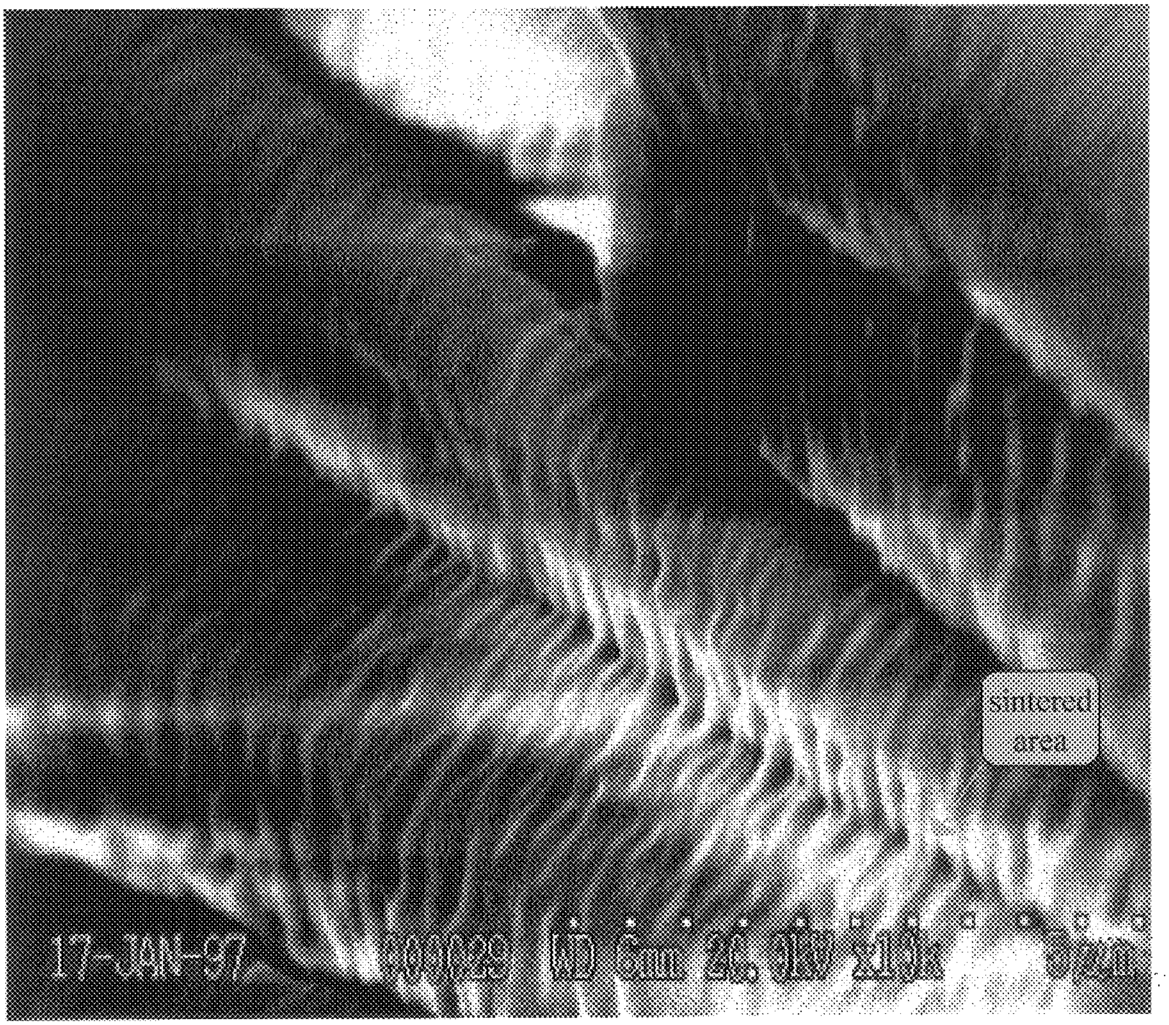
FIG. 6 is a scanning electron micrograph of prior art coated specimen without the bond inhibitor contemplated by the present invention.

The improvement in life may be further demonstrated by comparing the pronounced sintering of areas without alumina particles in FIG. 5*a* with the barely distinguishable spot weld type sintering of the peaks of the rough surface of the columnar grains of a prior art specimen with a platinum aluminide bond coat and a ceramic top coat at failure shown in FIG. 6. The difference is dramatic.

Various modifications and alterations to the above described preferred embodiment will be apparent to those skilled in the art. Accordingly, this description of the invention should be considered exemplary and not as limiting the scope and spirit of the invention as set forth in the following claims.

What is claimed is:

1. A superalloy article having a ceramic thermal barrier coating on at least a portion of its surface, comprising:

a superalloy substrate having a composition from which an aluminum oxide scale will form;

a ceramic coat overlying the super alloy substrate, the ceramic coat having a plurality of micron sized gaps extending from the top surface of the ceramic coat towards the substrate and defining a plurality of columns of the ceramic coat; and a bond inhibitor sheathing the columns.

2. The article of claim 1 wherein said bond inhibitor is selected from a group consisting of alumina, silica, titania and mixtures thereof.

3. The article of claim 2 wherein said bond inhibitor mixtures include unstabilized zirconia.

4. The article of claim 2 wherein said bond inhibitor mixtures include unstabilized hafnia.

5. The article of claim 2 wherein said bond inhibitor mixtures include unstabilized zirconia and unstabilized hafnia.

6. The article of claim 1 wherein said ceramic coat has a columnar grain microstructure.

7. The article of claim 1 wherein said bond inhibitor is alumina.

8. A superalloy article having a ceramic thermal barrier coating on at least a portion of its surface, comprising:

a superalloy substrate;

a bond coat overlying the substrate and selected from the group consisting of aluminides and MCrAlY where M is a metal selected from the group of iron, cobalt, nickel, and mixtures thereof;

a ceramic coat overlying the bond coat, the ceramic coat having a plurality of micron sized gaps extending from the top surface of the ceramic coat towards the bond coat and defining a plurality of columns of the ceramic coat; and a bond inhibitor sheathing the columns, the bond inhibitor is selected from a group consisting of alumina, silica, titania and mixtures thereof.

9. The article of claim 8 wherein said aluminide is selected from the group consisting of nickel aluminide and platinum aluminide.

10. The article of claim 8 wherein said ceramic coat has a columnar grain microstructure.

11. The article of claim 8 wherein said bond inhibitor is alumina.

12. The article of claim 8 wherein said bond inhibitor mixtures include unstabilized zirconia.

13. The article of claim 8 wherein said bond inhibitor mixtures include unstabilized hafnia.

14. The article of claim 8 wherein said bond inhibitor mixtures include unstabilized zirconia and unstabilized hafnia.

* * * * *

UNITED STATES PATENT AND TRADEMARK OFFICE

CERTIFICATE OF CORRECTION

PATENT NO. : 6,103,386
DATED : August 15, 2000
INVENTOR(S) : Derek Raybould et al.

It is certified that error appears in the above-identified patent and that said Letters Patent is hereby corrected as shown below:

Title page,
Item [73], add new line -- [73] Assingee: Allied Signal, Inc. (Morristown, N.J.) --.

Signed and Sealed this

Sixth Day of April, 2004

JON W. DUDAS
*Acting Director of the United States Patent and Trademark Office*